EDWARD N. HARRIS
INVENTOR.

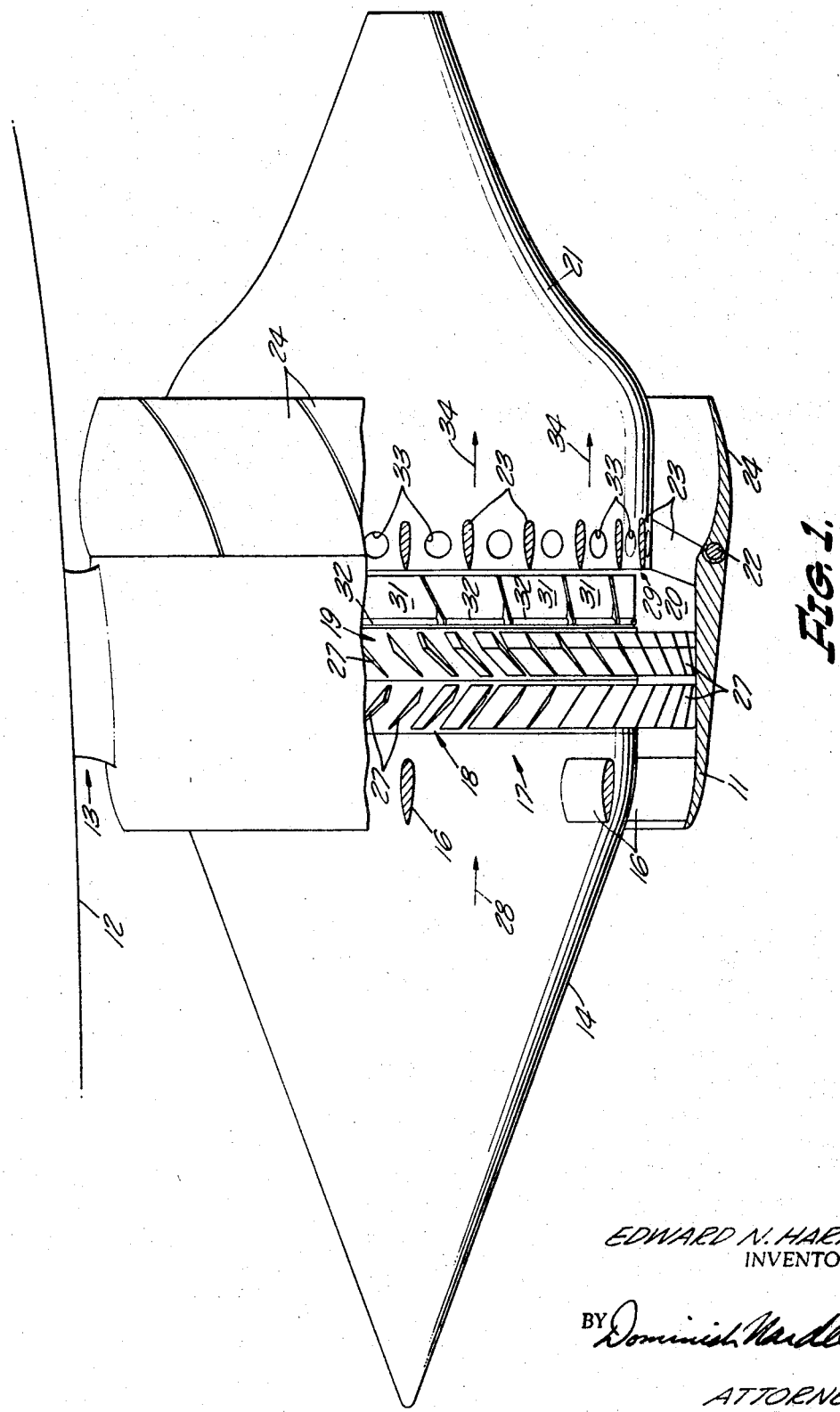

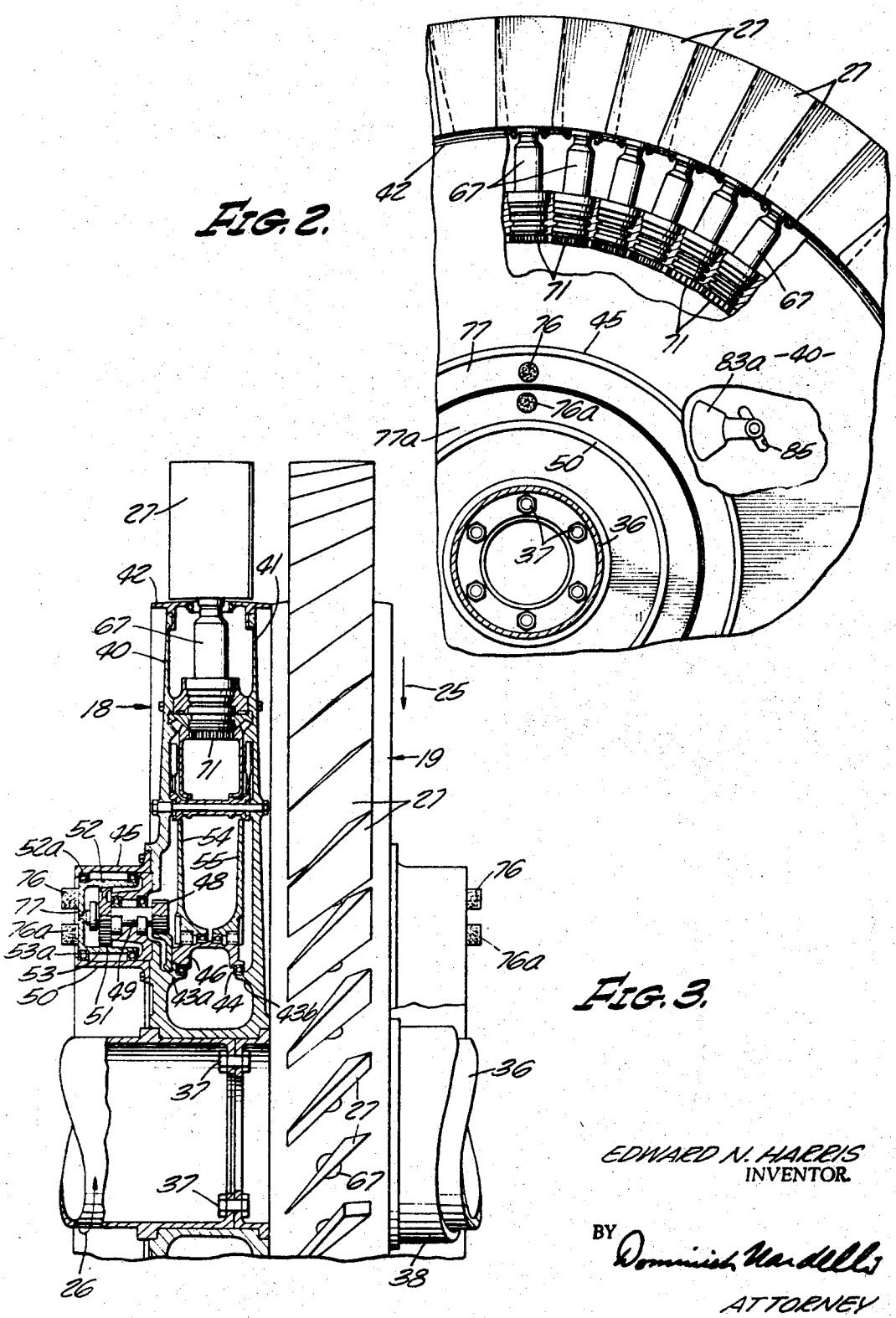

ATTORNEY

United States Patent Office 3,422,625
Patented Jan. 21, 1969

3,422,625
JET ENGINE WITH AN AXIAL FLOW
SUPERSONIC COMPRESSOR
Edward N. Harris, Palos Verdes Peninsula, Calif., assignor to The Garrett Corporation, Los Angeles, Calif., a corporation of California
Filed Aug. 5, 1966, Ser. No. 570,495
U.S. Cl. 60—268      4 Claims
Int. Cl. F02k *3/00;* F04d *21/00;* F04d *29/36*

This invention relates to an aircraft jet propulsion system which is capable of operating an aircraft from takeoff to hypersonic speeds and, more particularly, to the combination of an air inlet and an axial flow variable pitch compressor for the jet propulsion system to cause the compressor to accept air at subsonic and supersonic axial velocities and to permit compressor blade feathering so that the propulsion system may operate in a ramjet mode at high speeds.

In the past, the aircraft propulsion systems which were capable of operating an aircraft from takeoff to hypersonic speeds were of the turbojet type that were provided with a diffuser in the air intake which would slow down the incoming air to allow an axial compressor to further compress the air before being fed to a combustor of the turbojet. As the flight Mach number of the aircraft would increase to hypersonic speeds, this propulsion system would become inefficient for various reasons. Energy would be lost when the intake system diffused air to such low velocities; a high internal static temperature and pressure would be created, demanding heavy structure with high heat transfer rates; and the internal geometry would be fixed degrading the efficiency over the Mach number range.

In the present invention, the turbojet is so designed that the heavy subsonic diffuser at the air intake is eliminated causing air moving at supersonic velocities along the axis of the turbojet to enter the compressor face, i.e. the region where the high speed rotating compressor blades are located. In order to efficiently compress the air over a wide range of subsonic and supersonic velocities and to provide for blade feathering for ramjet operation, the compressor incorporates a variable geometry in that compressor blades with a variable pitch are provided on the compressor. Means are provided to change the pitch of the blades relative to changes in the axial speed of the air entering the compressor face. Thus, optimum performance is provided over a wide Mach number range. In the hypersonic range, the compressor blades are stopped and feathered converting the turbojet to a ramjet where combustion occurs in an airstream slowed down to subsonic velocities by the diffuser formed by the nonrotating blades. Among other advantages, the propulsion system of the present invention does not have the dead weight of the conventional diffuser disposed in front of the compressor face.

An object of this invention is to provide a lighter, more compact propulsion system for use in aircraft capable of flying up to hypersonic speed.

Another object of this invention is to provide an axial flow compressor for a jet engine which compressor accepts and compresses air passing through the compressor face at supersonic velocities.

Another object of this invention is to provide means for changing the pitch of the compressor blades independent of the rotational speed of the compressor rotor.

These and other objects and features of advantages will become apparent from the accompanying description and drawings, in which:

FIG. 1 is a side elevation of an engine incorporating the invention with a portion of the cylindrical housing removed showing the relative position of the compressor blades;

FIG. 2 is a front elevation of a sector of the compressor rotor shown in partial section;

FIG. 3 is an enlarged side elevation of the two compressor rotors shown in FIG. 1 and the forward compressor rotor is shown in section.

Figure 4:
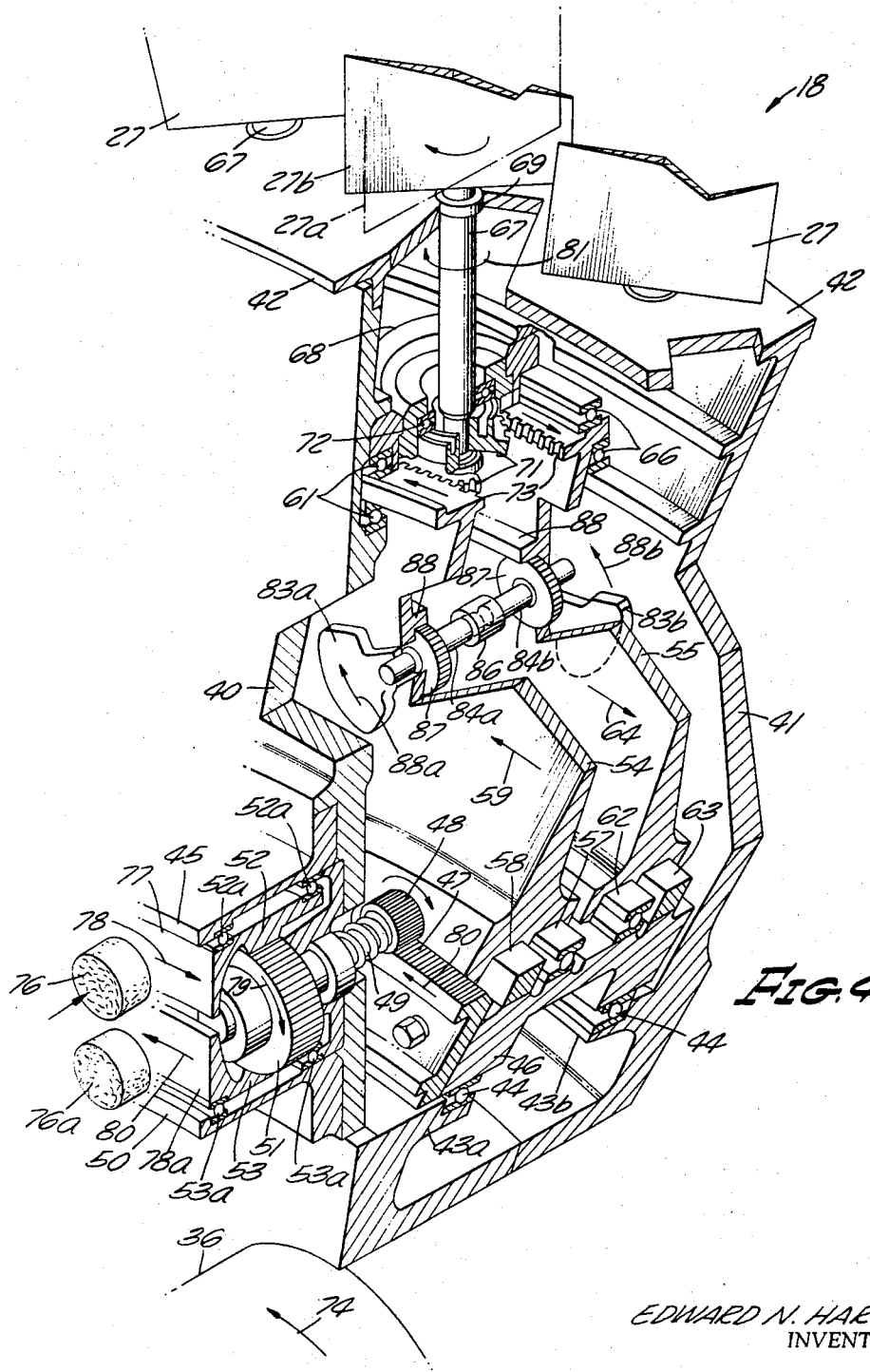
FIG. 4 is a pictorial sectional view of a compressor rotor showing the mechanism for varying the pitch of the blades independently of the rotational speed of the respective rotor.

Referring to FIG. 1, the aircraft propulsion system or jet engine, according to the invention, includes a cylindrical housing 11 which is fixed to the body of aircraft 12 (schematically shown) through suitable means 13. At the right or front end of the housing 11 is disposed a cone section 14 having a cone half angle of, for example, 20 degrees. The cone section 14 is fixed to the inside of the cylindrical housing 11 by a plurality of struts 16 disposed evenly around the axis of the jet engine (which is the axis of symmetry of the engine) to provide a ring-shaped air intake passageway therebetween. Immediately aft of the cone section 14 and struts 16 is located a novel axial compressor 17 with a forward rotor 18 and an aft rotor 19. The compressor 17 and rotors 18 and 19 will be explained more fully hereinafter. Aft of the compressor 17 is disposed an internal diffuser chamber 20 having a bypass ring-shaped opening 29. The opening 29 guides some of the compressed air within the confines of a conical-like member 21 which forms the internal portion of the jet nozzle. The external portion of the jet nozzle is comprised of a plurality of flaps 24 suitably hinged by hinges 22 to the aft end of housing 11. The conical-like member 21 is fixed to the aft end of the housing 11 by a plurality of struts 23 disposed evenly around the axis of the jet engine. The air which was bypassed within the member 21 is used to power suitable turbines (not shown) which rotate the rotors 18 and 19 in a standard manner and preferably by first combining and burning the bypassed air with excess fuel. The exhaust gases with the unburned fuel exit from the member 21 through suitable ports 33 and the remaining fuel burns within the main air stream and exhaust to the rear providing thrust. The flaps 24, since they are made to rotate in a standard manner about their hinges 22 by suitable means (not shown), change the geometry of the jet nozzle for maximum performance.

The propulsion system operates as follows: the rotors 18 and 19 are made to rotate by a suitable starting motor (not shown) that may be also disposed within the conical-like member 21. For example, referring to FIG. 3 the starting motor would rotate shafts 36 and 38 through suitable gearing (not shown). Shaft 36 is disposed on the axis of the jet engine and passes through both rotors but is keyed to rotor 18 by suitable bolt means 37 so that the starting motor rotates rotor 18 in the direction of arrow 26. The starting motor rotates the shaft 38, which is disposed around shaft 36 and fixed to rotor 19, in the direction of arrow 25. The rotors 18 and 19 have variable pitch blades 27 and when the pitch of the blades on the respective rotors is, as shown in FIG. 1, air will be moved through the housing 11 in the direction of arrow 28. A small fraction of the air flowing through the compressor 17 enters the bypass opening 29 formed between the member 21 and internal flap sections 31. Internal flap sections 31 are suitably hinged by hinges 32 and actuated by suitable means (not shown) so that the amount of air entering opening 29 is controllable. The air entering opening 29 is combined with fuel, preferably with more fuel than the air can burn and the mixture is used to drive turbines (not shown) which move the rotors 18 and 19. The fuel rich exhaust gases from the turbines pass through ports 33 to mix and burn with the main stream of air. The hot gases jet out through the nozzle formed by member 21 and flaps 24 in the direction of arrows 34.

When the aircraft is on the ground ready for take off the jet engine is operating and the pitch of the blades 27 is high, i.e., the angle, formed between the blades and a plane disposed normal to the axis of the jet engine, is large. As the aircraft gains speed the pitch of the blades is decreased by novel pitch control means shown in FIGS. 2, 3, and 4. When the aircraft is flying at the hypersonic speeds, the blades are feathered in such a manner as to form a nonrotating cascade which now becomes part of the inlet compression system. The flap sections 31 are rotated to close the by-pass opening 29 and the rotation of the rotors is preferably stopped.

Referring primarily to FIG. 4, a portion of one of the rotors, for example rotor 18, is shown pictorially with portions of its components broken away in order to understand the operation of the pitch control means, which changes the pitch of the blades 27 independently of the rotaing speed of rotor. The rotor 18 includes two discs, a forward disc 40 and an aft disc 41 which are continuous from the shaft 36 to a rim 42. The rim 42 is preferably made integral with disc 41. The discs 40 and 44 are suitably joined together in fixed relationship at the hub, and at the rim. Adjacent the hub, discs 40 and 41 have integral internal flanges 43a and 43b, respectively, on which are suitably mounted roller bearings 44. Bearings 44 support a ring 46 which spans the flanges 43a and 43b and rotates coaxially therewith. Concentrically on the ring 46 there is bolted a large gear 47 which engages a gear pinion 48 that is respectively mounted on a shaft 49 suitably bearing mounted on disc 40 so that pinion 48 and shaft 49 rotate about an axis parallel to and spaced from the jet engine axis or to the axis of shaft 36. On the other end of shaft 49 is disposed another gear 51 which engages both an internal gear 52 and an external gear 53. Gears 52 and 53 are disposed to rotate relative to the disc 40 and coaxially therewith. Suitable bearings 52a and 53a provide a bearing support for the gears 52 and 53, respectively, on flanges 45 and 50 that are suitably fixed to disc 40.

Mounted coaxially on ring 46 are two pitch drive wheels 54 and 55. The wheel 54 is bearing mounted on ring 46 by a bearing 57, in co-operation with, a sprague or over-riding clutch 58 (shown schematically). The over-riding clutch 58 is of the standard type which allows wheel 54 to rotate freely with respect to the ring 46 only in the direction of the arrow 59 but is locked thereto when the wheel 54 tends to rotate in the opposite direction. For rigidity, the periphery of the wheel 54 is also bearing mounted to disc 40 by suitable bearings 61.

The other pitch drive wheel 55 is mounted similarly to ring 46 by bearing 62 and an over-riding clutch 63 (schematically shown) which allows the wheel 55 to rotate freely with respect to the ring 46 in the direction of arrow 64. The clutch 63 locks the wheel 55 to ring 46 when the wheel 55 tends to rotate in the opposite direction. Thus, the wheels 54 and 55 rotate freely with respect to ring 46 when they rotate in opposite directions. The periphery of the wheel 55 is also bearing mounted to disc 41 by bearings 66.

Each blade 27 is mounted to the rotor 18 in the following manner. Each blade 27 has a shaft 67 which protrudes through a suitable bore in the rim 42 and another bore in a thrust ring 68. The thrust ring 68 is disposed coaxially and suitably fixed to both discs 40 and 41. A suitable bearing 69 is provided between the rim 42 and shaft 67. The internal end of shaft 67 has a gear 41 suitably keyed thereto, which bears against a thrust bearing 72 which, in turn, bears against the thrust ring 68. The gear 71 engages axially extending gear teeth 73 formed on both pitch drive wheels 54 and 55.

The pitch actuating means for the rotor 18 operates as follows. When the shaft 36 rotates in the direction of arrow 74 all the elements in the rotor 18 normally rotate in the same direction and at the same rotational speed provided that no external force is applied to the rotor. However, when an external breaking force from a suitable actuator (not shown) is applied to slow down the rotation of gear 52, for example, by pressing a brake pad 76 against suitable surface 77 on gear 52, the gear 52 would move in the direction of arrow 78a with respect to the disc 40. This movement of gear 52 causes the gear 51 to rotate in the direction of arrow 79 causing both the gear 53 and the gear 47 on ring 46 to move in the direction of arrows 80 relative to disc 40 and also disc 41. This movement of the ring 46 locks the over-riding clutch 58 causing the drive wheel 54 to move with the ring 46. However, the other over-riding clutch 63 is not locked. The gear teeth 73 on the drive wheel 54 causes the gear 71 on shaft 67 to rotate in the direction of the arrow 81 whereby the blade rotates from a position shown by dash lines 27a to the position shown by the solid lines 27b. In addition, the rotation of gears 71 cause the other pitch drive wheel 55 to rotate in the direction of arrow 64 relative to the disc 41, as the over-riding clutch 63 permits the wheel 55 to move in this direction. Conversely, when the pitch of the blades 27 is required to be increased, the force is applied to another breaking pad 76a instead of to pad 76. The pad 76a engages a breaking surface 78a on gear 53 and the action described above is performed in reverse. Suitably sensing means (not shown) could be used to determine the pitch of the blades and, in turn, commands which one of the breaking forces need to be applied to change the pitch.

When the blades are positioned between the full feathered portion parallel the jet engine axis, and the full closed position (normal to the jet engine axis) a torque is produced by the blades rotating about the jet engine axis which torque tends to rotate the blades to the full closed or open position. This torque is compensated by weights 83a and 83b which are mounted on shafts 84a and 84b, respectively. The shafts 84a and 84b are disposed coaxially and are free to rotate independently of each other by a suitable bearing bushing 86. The shafts protrude through elongated holes formed in the respective drive wheels, such as elongated hole 85 (shown in FIG. 2). Keyed to each of shafts 84a and 84b is a gear 87 which respectively engages suitable gear teeth 88 formed on drive wheels 54 and 55. When the rotor 18 is rotating, centrifugal force will cause the weights 83a and 83b to rotate in the direction of arrows 88a and 88b, respectively. The gears 87a and 87b, respectively, would tend to rotate the respective drive wheel 54 and 55 in the opposite direction than the torque developed by the blades 27 rotating about the jet engine axis. This torque developed by the rotating blades is applied to the pitch actuating means in the direction of arrow 81.

With the present disclosure in view, modifications of the invention would appear to those skilled in the art. Accordingly, the invention is not limited to the exact details of the illustrated embodiment but includes all such modifications and variations coming within the scope of the invention as defined in the appended claims.

I claim:

1. A jet engine comprising:
   a tubular housing,
   a nose cone disposed coaxial with said tubular housing and forming an annular passageway between the nose cone and the housing,
   an axial flow compressor having two rotors disposed coaxially and face to face and having a plurality of blades extending radially from each rotor, said compressor being disposed within said housing,
   said annular passageway extending from the forward end of said housing to said blades and having a fixed, substantially constant cross-sectional area,
   means on each of said rotors for changing the pitch of the respective blades thereon independently of the rotational speed of the respective rotor and independently of the pitch on the blades on the other rotor, and
   means for rotating both rotors in opposite directions about the axis of said housing.

2. The jet engine of claim 1 wherein:

an internal nozzle member is disposed aft of said compressor and protruding from the rearward end of said housing forming an annular nozzle passageway between the internal nozzle member and the housing, and said housing includes moveable portions to vary areal opening of said annular nozzle passageway to maximize the produced thrust.

3. The jet engine of claim 2 wherein:

said means for changing the pitch of the blades includes, a gear ring member disposed within said rotor and disposed to rotate coaxial therewith, an axle extending into said rotor and disposed to rotate about an axis disposed parallel the axis of said housing, a gear pinion disposed on the end of said shaft and engaging said gear ring member to cause said ring gear member to rotate with respect to said rotor whenever said shaft rotates about its axis, two pitch drive discs on said ring member and disposed to rotate coaxial with respect to the ring member, means disposed between said discs and said ring means to cause one of the discs to rotate only in one direction with respect to the ring member and to cause the other disc to rotate only in the opposite direction with respect to said ring member, each of said blades having a shaft protruding into said rotor and a gear disposed thereon, said discs having gear teeth engaging each of said gears on said blades so that when the pitch of the blade changes the discs rotate in counter directions, and means for rotating said axle as the rotor rotates to cause the pitch to change.

4. The jet engine of claim 1 wherein:

said means for changing the pitch of the blades includes, a gear ring member disposed within said rotor and disposed to rotate coaxial therewith, an axle extending into said rotor and disposed to rotate about an axis disposed parallel the axis of said housing, a gear pinion disposed on the end of said shaft and engaging said gear ring member to cause said ring gear member to rotate with respect to said rotor whenever said shaft rotates about its axis, two pitch drive discs on said ring member and disposed to rotate coaxial with respect to the ring member, means disposed between said discs and said ring means to cause one of the discs to rotate only in one direction with respect to the ring member and to cause the other disc to rotate only in the opposite direction with respect to said ring member, each of said blades having a shaft protruding into said rotor and a gear disposed thereon, said discs having gear teeth engaging each of said gears on said blades so that when the pitch of the blade changes the discs rotates in counter directions, and means for rotating said axle as the rotor rotates to cause the pitch to change.

References Cited
UNITED STATES PATENTS

| | | | |
|---|---|---|---|
| 2,762,192 | 9/1956 | Ward | 60—244 XR |
| 2,968,146 | 1/1961 | Howell et al. | 60—244 XR |
| 3,000,176 | 9/1961 | Kuhrt | 60—244 |
| 2,434,678 | 1/1948 | Szczeniowski | 230—123 XR |
| 2,685,341 | 8/1954 | Busquet | 230—114 XR |
| 2,780,424 | 2/1957 | Price | 60—269 XR |
| 2,798,360 | 7/1957 | Hazen et al. | 60—271 XR |
| 2,851,214 | 9/1958 | Busquet | 230—114 XR |
| 2,947,466 | 8/1960 | Busquet | 230—114 |
| 2,955,747 | 10/1960 | Schwaar | 230—123 |
| 3,127,093 | 3/1964 | Sudrow | 230—123 |

FOREIGN PATENTS

| | | |
|---|---|---|
| 606,560 | 8/1948 | Great Britain. |
| 563,463 | 5/1957 | Italy. |

CARLTON R. CROYLE, *Primary Examiner.*

U.S. Cl. X.R.

60—244; 230—114, 123